United States Patent
Chang et al.

(10) Patent No.: US 11,022,713 B2
(45) Date of Patent: Jun. 1, 2021

(54) DIPOLE MODELING FOR ELECTRIC AND/OR MAGNETIC FIELDS

(71) Applicant: Halliburton Energy Services, Inc., Houston, TX (US)

(72) Inventors: Paul Ching Ling Chang, Cypress, TX (US); Burkay Donderici, Houston, TX (US); Glenn Andrew Wilson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 239 days.

(21) Appl. No.: 15/776,737

(22) PCT Filed: Jul. 20, 2017

(86) PCT No.: PCT/US2017/043129
§ 371 (c)(1),
(2) Date: May 16, 2018

(87) PCT Pub. No.: WO2019/017957
PCT Pub. Date: Jan. 24, 2019

(65) Prior Publication Data
US 2020/0271816 A1    Aug. 27, 2020

(51) Int. Cl.
*G01V 3/28* (2006.01)
*E21B 47/09* (2012.01)
*G01V 3/38* (2006.01)

(52) U.S. Cl.
CPC ............... *G01V 3/28* (2013.01); *E21B 47/09* (2013.01); *G01V 3/38* (2013.01)

(58) Field of Classification Search
CPC ............. E21B 47/09; G01V 3/38; G01V 3/26
See application file for complete search history.

(56) References Cited

U.S. PATENT DOCUMENTS

| 9,772,413 B2 * | 9/2017 | Krohn ................ G01V 1/005 |
| 2006/0202806 A1 | 9/2006 | Bonner et al. |
| 2008/0136419 A1 | 6/2008 | Seydoux et al. |
| (Continued) | | |

FOREIGN PATENT DOCUMENTS

WO    2015069282    5/2015

OTHER PUBLICATIONS

G. Borisov, A. Bespalov, and M. Epov, 2006, Mathematical modeling of induction measurements in the presence of a metal mandrel: 76th Annual International Meeting, SEG.

(Continued)

*Primary Examiner* — Alvaro E Fortich
(74) *Attorney, Agent, or Firm* — Benjamin Ford; C. Tumey Law Group PLLC

(57) ABSTRACT

A method for dipole modeling may comprise providing an electromagnetic induction tool comprising an electromagnetic antenna, disposing the electromagnetic induction tool in a wellbore, and activating the electromagnetic antenna. The method may further comprise producing a dipole array equivalent of the electromagnetic antenna, where the dipole array equivalent comprises at least two dipoles. Additionally, the method may comprise implementing the dipole array equivalent in a forward model within an inversion process, wherein the inversion process determines an electromagnetic property.

22 Claims, 12 Drawing Sheets

(56) References Cited

U.S. PATENT DOCUMENTS

| | | | | |
|---|---|---|---|---|
| 2008/0224707 A1* | 9/2008 | Wisler | ............... | H01Q 1/04 |
| | | | | 324/338 |
| 2011/0155389 A1* | 6/2011 | Burtz | ............... | G01V 99/00 |
| | | | | 166/369 |
| 2013/0032404 A1 | 2/2013 | Donderici et al. | | |
| 2013/0261975 A1* | 10/2013 | Yang | ............ | G01V 3/28 |
| | | | | 702/10 |
| 2015/0301222 A1 | 10/2015 | Davydychev et al. | | |
| 2015/0361789 A1* | 12/2015 | Donderici | ............ | G01V 3/20 |
| | | | | 367/82 |
| 2016/0259085 A1 | 9/2016 | Wilson et al. | | |

OTHER PUBLICATIONS

Hagiwara, T., Banning, E J., Ostermeier, R. M., & Haugland, S. M. (Jan. 1, 2003). Effects of Mandrel, Borehole, and Invasion for Tilt-Coil Antennas. Society of Petroleum Engineers.

Dutta*, Sushant M. "Efficient simulation of transient electromagnetic measurements in the presence of a metal mandrel." SEG Technical Program Expanded Abstracts 2015. Ed. Robert Vincent Schneider. Society of Exploration Geophysicists, 2015. 777-780.

International Search Report and Written Opinion for Application No. PCT/US2017/043129 dated Feb. 21, 2018.

"Modelling of airborne EM anomalies with magnetic and electric dipoles buried in a layered earth" by Sallel et al. Published in Exploration Geophysics vol. 37, No. 3, in 2006 on pp. 254-260.

"Time-Harmonic Electromagnetic Fields" by Roger F. Harrington published by McGraw-Hill, New York in 1961, pp. 106-110.

* cited by examiner

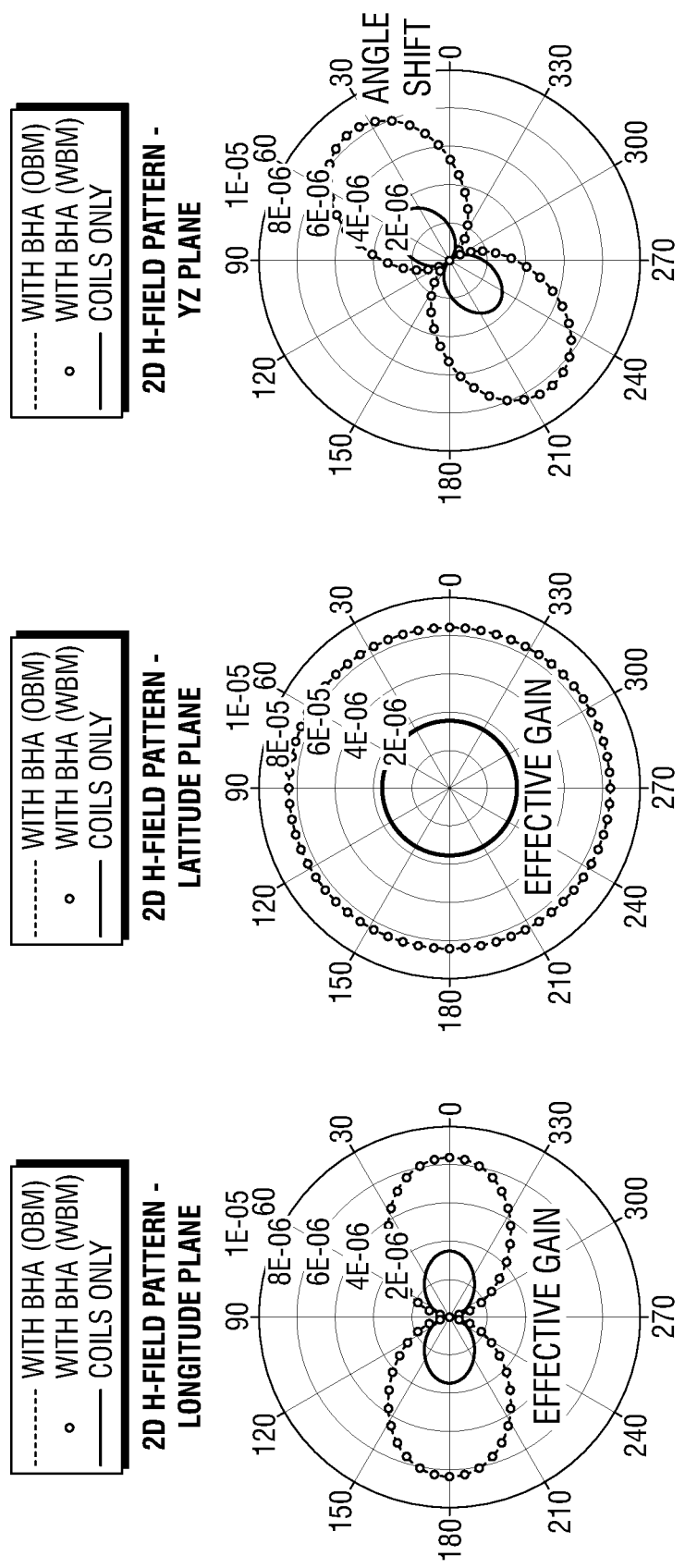

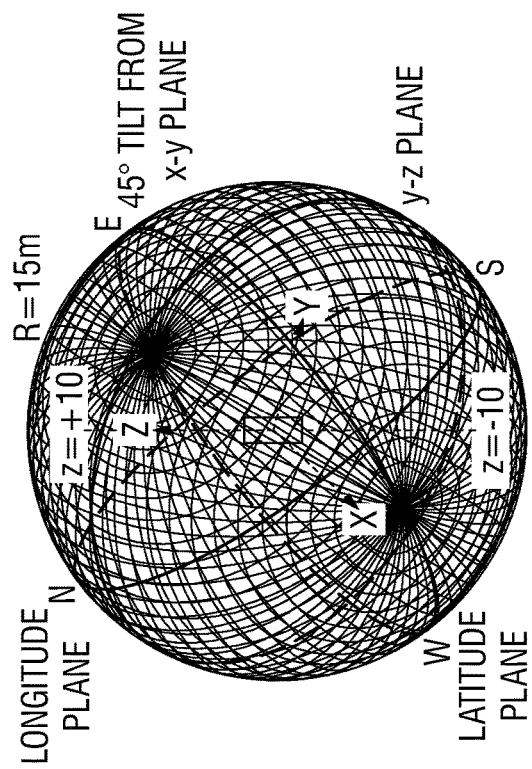
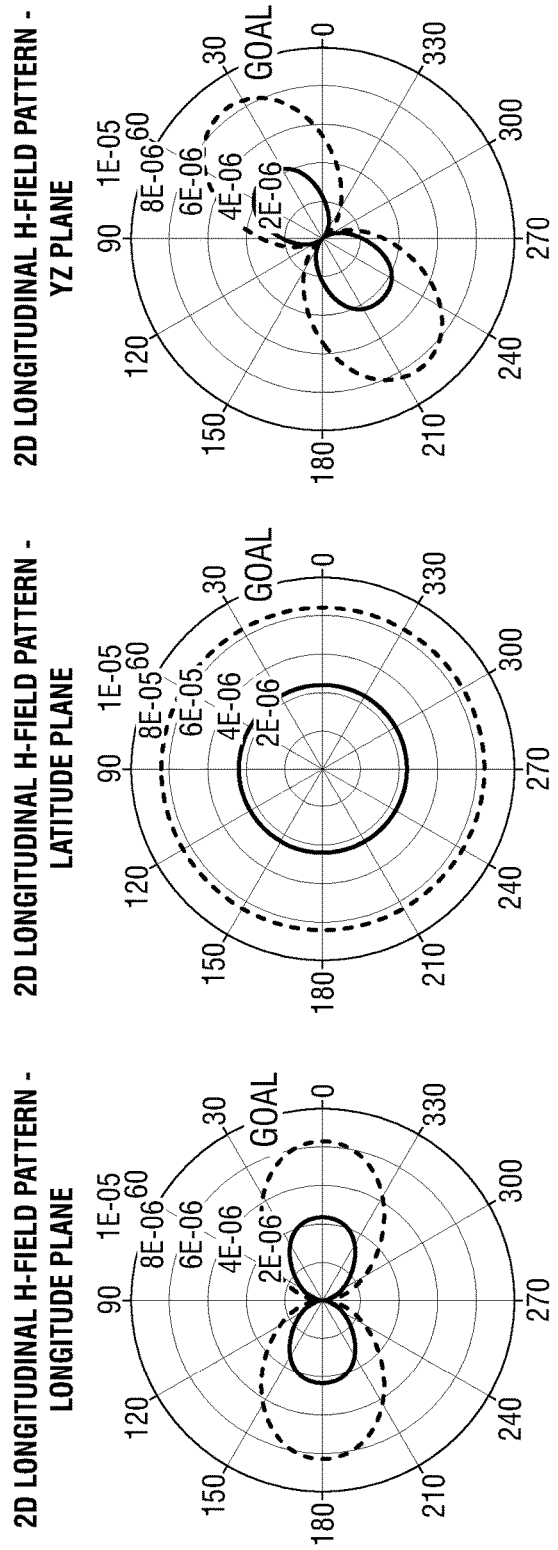
FIG. 6A

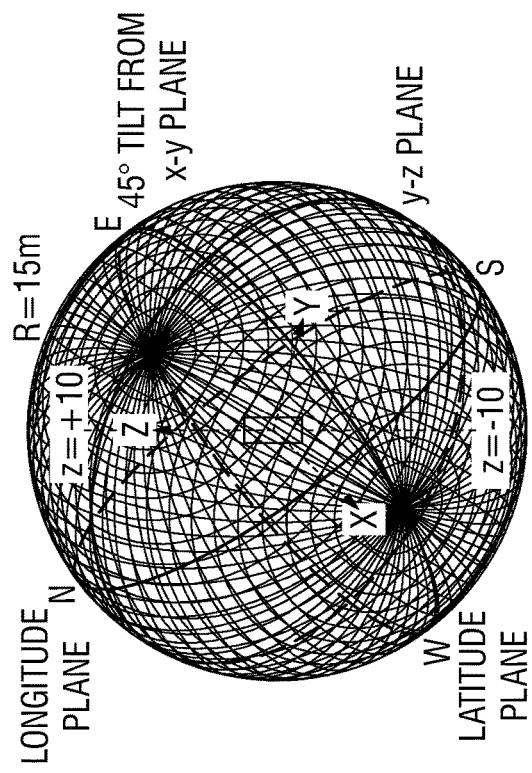
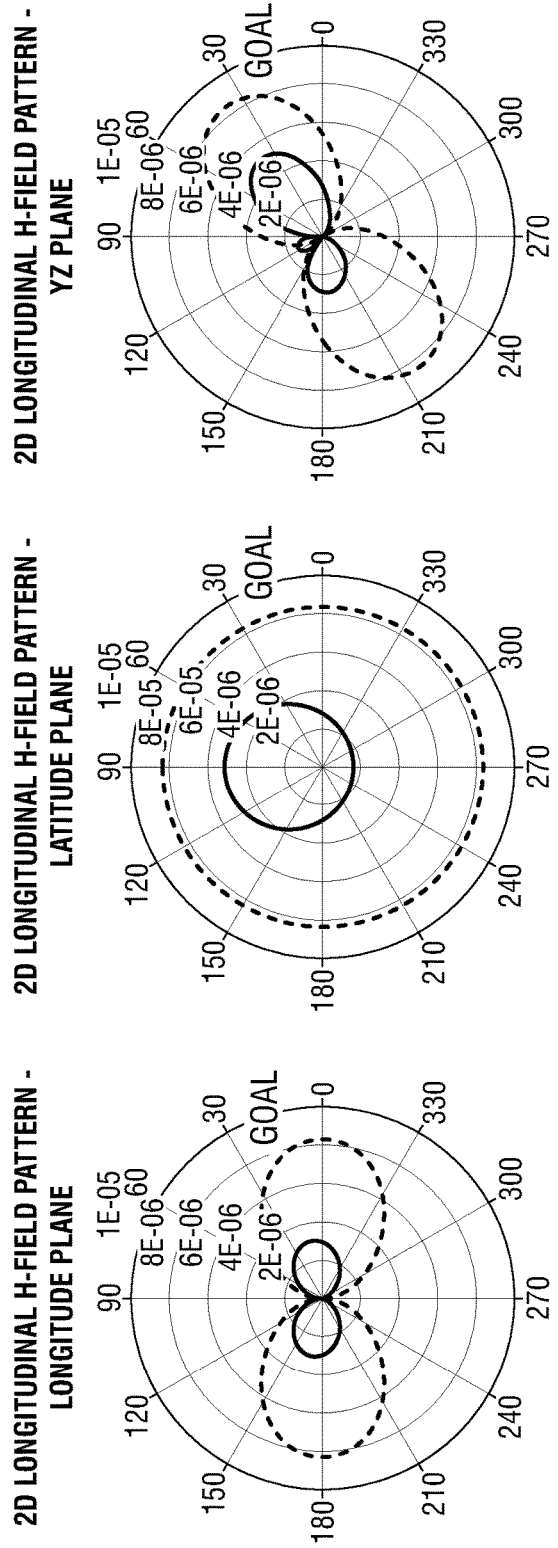
FIG. 7A ically, the methods for
DIPOLE MODELING FOR ELECTRIC AND/OR MAGNETIC FIELDS

BACKGROUND

In well operations, it may be desirable to survey the formation using an electromagnetic induction tool disposed in a wellbore. Without limitation, one type of downhole tool may be an electromagnetic induction tool that may be used to make measurements of the electrical resistivity of earth formations penetrated by a wellbore or make measurements of distance and direction to a second well. Electromagnetic induction tools may be used in logging-while-drilling/measuring-while-drilling operations, electromagnetic ranging, wireline logging, and permanent monitoring systems, among others. EM induction tools, or instruments, may typically comprise at least one electromagnetic source and at least one electromagnetic antenna. The electromagnetic source(s) and coil receiver(s) may be disposed on a tubular, such as a bottom hole assembly, mandrel, and/or casing joint. In examples, the electromagnetic induction tool may be implemented to determine the distance and direction to surrounding wells. Additionally, the electromagnetic induction tool may be disposed in a wellbore for the purpose of investigating electrical properties of subterranean formations and wells adjacent the wellbore. An electrical property of interest may be the electrical conductivity of particular portions of the formation. An alternating current having at least one frequency may be conducted through the electromagnetic source(s). The alternating current may induce eddy current to flow within the surrounding subterranean formations and/or in adjacent well casings. This eddy current in turn may induce voltages in electromagnetic antenna(s).

Electromagnetic antenna(s) may record the voltages, which may be processed to produce a field pattern. The field pattern may be representative of the actual electric and/or magnetic field recorded. The field pattern may contain information as to alterations in voltages in all directions, which may be used to determine formation resistivity, water fronts, and/or target wells. Field patterns may contain large amounts of information and may take hours and/or days to fully process.

BRIEF DESCRIPTION OF THE DRAWINGS

These drawings illustrate certain aspects of some examples of the present disclosure, and should not be used to limit or define the disclosure.

FIG. 5 is a schematic illustration of a graph of a longitudinal H-field pattern in a longitude plane, a latitude plane, and a YZ plane;

DETAILED DESCRIPTION

Figure 1:
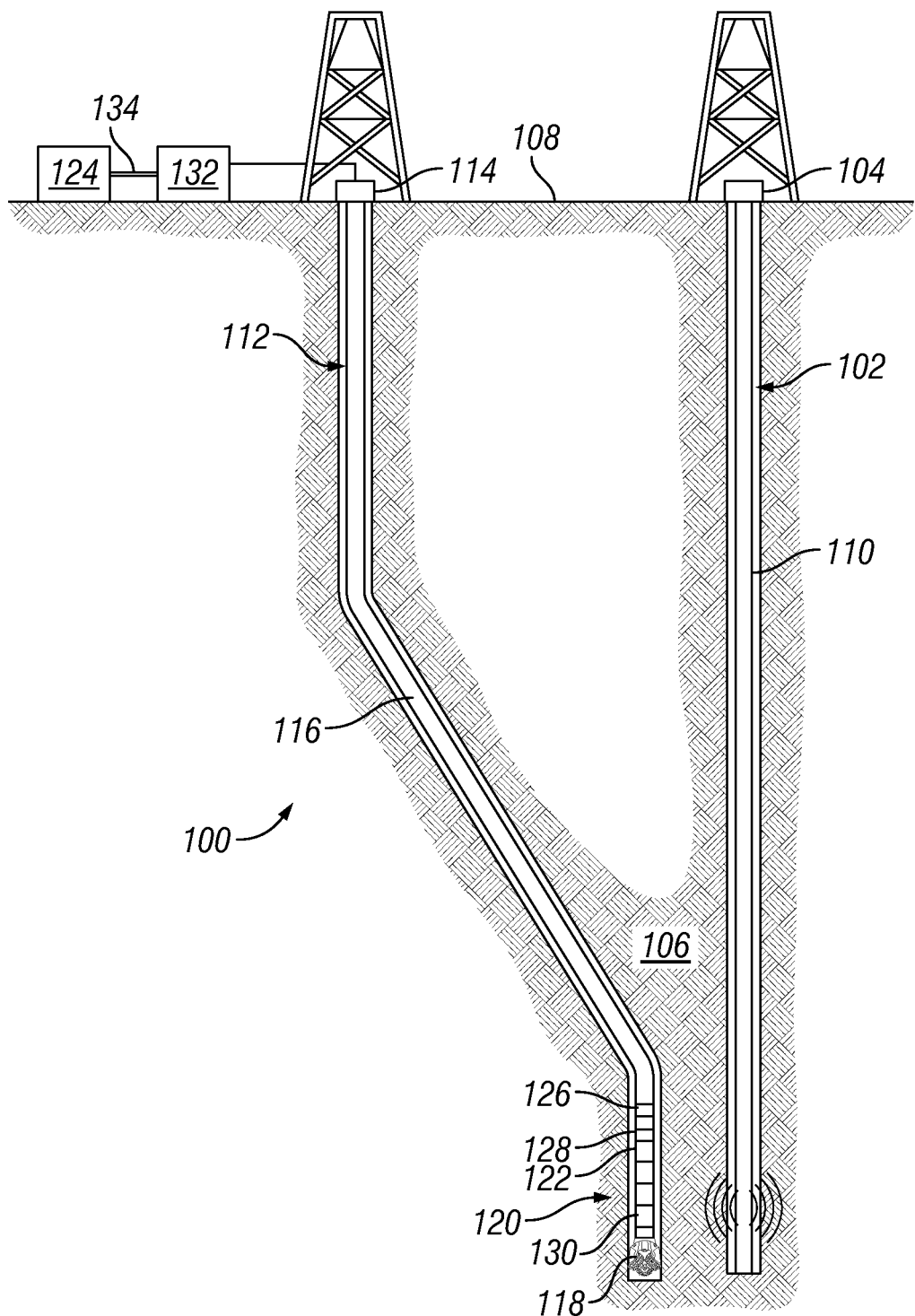
FIG. 1 is a schematic illustration of an electromagnetic sensor system disposed in a wellbore.

The present disclosure relates to downhole electromagnetic induction tools and, more particularly, to methods for processing electric and/or magnetic fields recorded by an electromagnetic antenna disposed on the electromagnetic induction tool with representative dipoles. As disclosed herein, the term "electromagnetic induction tool" may denote any electromagnetic induction tool which works at least in part based on induction principles. The term "electromagnetic induction tool" is not intended to limit the application to subterranean formation resistivity measurement and without limitation may include ranging applications, where a distance and/or direction to a second wellbore may be calculated, wireline application, and/or permanent monitoring applications.

In examples, an electromagnetic antenna may be disposed on an electromagnetic induction tool. The electromagnetic induction tools may be used in a number of downhole induction tools operations, such as measuring-while-drilling (MWD), logging-while-drilling (LWD), wireline logging, and permanent monitoring operations. In examples, without limitation, tubulars may be disposed within the drill collar on a bottom hole assembly, a wireline tool mandrel, and/or permanently installed production casing. For brevity, the metallic tubular may be referred to as a bottom hole assembly below. The electromagnetic antenna in the electromagnetic induction tool may be a magnetometer and/or an induction coil, which may reside on the bottom hole assembly and/or outside. In examples, an electromagnetic source may be an electromagnetic antenna, which may be energized to produce an electromagnetic field. Where used, either the electromagnetic antenna and/or electromagnetic source may reside on the bottom hole assembly and/or outside, even on the surface.

Electromagnetic antennae may record voltages from electromagnetic fields induced by the electromagnetic source. Depending on details of the electromagnetic antenna's design and the size of the computation domain (e.g. mandrel and wellbore lengths) included in an inversion computation, it may take hours to a matter of days to fully compute recorded data from electromagnetic antenna(s). Without limitation, operations that may compute electric and/or magnetic fields may determine the distance and inclination of target well in ranging applications, bed resistivity and distances to bed boundaries in resistivity application, as well as distance to oil-water interface and resistivity change in waterflood monitoring application. Computation of the inversion may comprise a list of unknown parameters and the accuracy of these parameters may depend on the accuracy of a forward model. Forward models may comprise full-wave methods which may capture the mandrel and the wellbore effect accurately.

Methods of the present disclosure may be implemented, at least in part, with an information handling system. Without limitation, the information handling system may process forward models, inversions, and the like. An information handling system may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates an electromagnetic sensor system 100. Specifically, FIG. 1 shows an electromagnetic sensor system 100 for ranging applications. As illustrated, a target wellbore 102 may extend from a first wellhead 104 into a subterranean formation 106 from a surface 108. Generally, target wellbore 102 may include horizontal, vertical, slanted, curved, and other types of wellbore geometries and orientations. Target wellbore 102 may be cased or uncased. A conductive member 110 may be disposed within target wellbore 102 and may comprise a metallic material that may be conductive and magnetic. By way of example, conductive member 110 may be a casing, liner, tubing, or other elongated steel tubular disposed in target wellbore 102. Determining the position and direction of target wellbore 102 accurately and efficiently may be required in a variety of applications. For example, target wellbore 4 may be a "blowout" well. Target wellbore 102 may need to be intersected precisely by a second wellbore 112 in order to stop the "blowout." Alternatively, it may be desired to avoid collision with target wellbore 102 in drilling second wellbore 112 or it may be desired to drill the second wellbore parallel to the target wellbore 102, for example, in SAGD applications. In examples, target wellbore 102 may not be accessible and/or information about the position and structure of target wellbore 102 may not be available. Electromagnetic sensor system 100 may be used for determining the location of target wellbore 4 with respect to second wellbore 112.

With continued reference to FIG. 1, second wellbore 112 may also extend from a second wellhead 114 that extends into subterranean formation 106 from surface 108. Generally, second wellbore 112 may include horizontal, vertical, slanted, curved, and other types of wellbore geometries and orientations. Additionally, while target wellbore 102 and second wellbore 112 are illustrated as being land-based, it should be understood that the present techniques may also be applicable in offshore applications. Second wellbore 112 may be cased or uncased. In examples, a drill string 116 may begin at second wellhead 114 and traverse second wellbore 112. A drill bit 118 may be attached to a distal end of drill string 116 and may be driven, for example, either by a downhole motor and/or via rotation of drill string 116 from surface 108. Drill bit 118 may be a part of conductive body 120 at distal end of drill string 116. While not illustrated, conductive body 120 may further comprise one or more of a mud motor, power module, steering module, telemetry subassembly, and/or other sensors and instrumentation as will be appreciated by those of ordinary skill in the art. As will be appreciated by those of ordinary skill in the art, conductive body 120 may be a measurement-while drilling (MWD) or logging-while-drilling (LWD) system.

Without limitation, electromagnetic sensor system 100 may comprise an electromagnetic induction tool 122. While FIG. 1 illustrates use of electromagnetic induction tool 122 on drill string 116, it should be understood that electromagnetic induction tool 122 may be alternatively used on a wireline. Electromagnetic induction tool 122 may be a part of conductive body 120. Electromagnetic induction tool 122 may be used for determining the distance and direction to target wellbore 102. Additionally, electromagnetic induction tool 122 may be connected to and/or controlled by information handling system 124, which may be disposed on surface 108. In examples, information handling system 124 may communicate with electromagnetic induction tool 122 through a communication line (not illustrated) disposed in (or on) drill string 116. In examples, wireless communication may be used to transmit information back and forth between information handling system 124 and electromagnetic induction tool 122. Information handling system 124 may transmit information to electromagnetic induction tool 122 and may receive as well as process information recorded by electromagnetic induction tool 122. In addition, electromagnetic induction tool 122 may include a downhole information handling system 126, which may also be disposed on conductive body 120. Downhole information handling system 126 may include, without limitation, a microprocessor or other suitable circuitry, for estimating, receiving and processing signals received by the electromagnetic induction tool 122. Downhole information handling system 126 may further include additional components, such as memory, input/output devices, interfaces, and the like. While not illustrated, the electromagnetic induction tool 122 may include one or more additional components, such as analog-to-digital converter, filter and amplifier, among others, that may be used to process the measurements of the electromagnetic induction tool 122 before they may be transmitted to surface 108. Alternatively, raw measurements from electromagnetic induction tool 122 may be transmitted to surface 108.

In examples, electromagnetic induction tool 122 may comprise an electromagnetic source 128 and/or an electromagnetic antenna 130. It should be noted that electromagnetic induction tool 122 may comprise a plurality of electromagnetic sources 128 and/or a plurality of electromagnetic antennae 130. The plurality of electromagnetic sources 128 and the plurality of electromagnetic antennae 130 may be disposed along a longitudinal axis of the electromagnetic induction tool 122. As disclosed, the concepts that are described herein are valid for any type of electromagnetic source 128 and electromagnetic antenna 130. As an example, wire antenna, toroidal antenna and/or azimuthal button electrodes, transmitter coils, and/or receiver coils may also be used in the place of the electromagnetic source 128 and/or the electromagnetic antenna 130. In some examples, the electromagnetic antenna 130 may comprise a transmitters, a receiver, or a transceiver. Without limitation, electromagnetic source 128 and/or electromagnetic antenna 130 may be disposed on and/or adjacent to a gap sub. In examples, there may be more than one gap sub in which electromagnetic source 128 and/or electromagnetic antenna 130 may be disposed on and/or adjacent to.

During downhole operations in which electromagnetic induction tool 122 may be utilized, an azimuthal current may be present within areas in which electromagnetic sources 128 and/or electromagnetic antennae 130 may be disposed. Azimuthal currents may be especially pronounced when electromagnetic source 128 and/or electromagnetic antenna 130 may be coaxial. Azimuthal currents and axial currents may be induced on electromagnetic induction tool 122. In examples, electromagnetic source 128 and electromagnetic antenna 130 may be spaced axially on along the central or z-axis of electromagnetic induction tool 122. In some examples, electromagnetic source 128 and/or electromagnetic antenna 130 may be tilted at an angle, for example of about forty-five degrees. To prevent the movement of azimuthal and/or axial currents along electromagnetic induction tool 122, a gap sub, discussed below, may be employed.

Any suitable technique may be used for transmitting signals from electromagnetic induction tool 122 to surface 108, including, but not limited to, wired pipe telemetry, mud-pulse telemetry, acoustic telemetry, and electromagnetic telemetry. While not illustrated, conductive body 120 may include a telemetry subassembly that may transmit telemetry data to the surface. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer 132. Digitizer 132 may supply a digital form of the telemetry signals to information handling system 124 via a communication link 134, which may be a wired or wireless link. The telemetry data may be analyzed and processed by information handling system 124. For example, the telemetry data could be processed to determine location of target wellbore 102. With the location of target wellbore 102, a driller could control the conductive body 120 while drilling second wellbore 112 to intentionally intersect target wellbore 102, avoid target wellbore 102, and/or drill second wellbore 112 in a path parallel to target wellbore 102.

Figure 2:
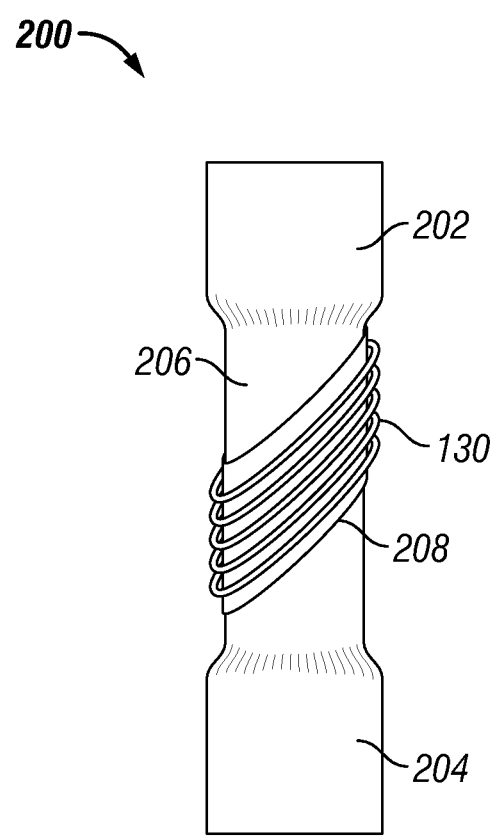
FIG. 2 is a schematic illustration of a mandrel which may comprise a electromagnetic antenna.

FIG. 2 illustrates a mandrel 200, which may comprise a first section 202, a second section 204, a center section 206, and an electromagnetic antenna 130 disposed about a ferrite sleeve layer 208. In examples, electromagnetic antenna 130 may be a tilted design mounted on mandrel 200 in a groove for mechanical protection from drilling effects and disposed inside second wellbore 112 (e.g., referring to FIG. 1). For examples, electromagnetic antenna 130 may be disposed in a groove for mechanical protection from drilling effects. Electromagnetic antenna 130 of arbitrary complexity (e.g., tilted, or with tool body effects) may be simulated with an equivalent source of a linear combinations of collocated or proximal tri-axial electric and/or magnetic dipoles.

In examples, logging-while-drilling tools may feature mandrel 200 (e.g. Referring to FIG. 2), which may be long and metallic, encompassed by electromagnetic source 128 and/or electromagnetic antennae 130. The principle of operation of these tools may be to induce currents on nearby targets through electromagnetic sources and/or record secondary magnetic fields by electromagnetic antenna 130, where electromagnetic sources 128 and electromagnetic antennae 130 may be disposed at different positions along the axis of mandrel 200. To increase azimuthal sensitivity for geo-steering and imaging operations, electromagnetic antenna 130 may be designed to be tilted with respect to the axis of drill collar. Without limitation, a segmented ferrite sleeve layer (e.g., ferrite sleeve layer 208) between electromagnetic antenna 130 and mandrel 200 may enhance magnetic flux. In addition to mandrel 200, there may also be a metallic shield around electromagnetic antenna 130 for mechanical protection. Even though mandrel 200 and/or shield improves mechanical properties, their presence near electromagnetic antenna 130 may have a negative impact on electromagnetic antenna's field pattern. Physically, the presence of mandrel 200 may disrupt the original field pattern of electromagnetic antenna 130, which may resemble that of a distribution of electric/magnetic dipoles. This may be induced by an electromagnetic source 128, which may induce currents on targets wellbores but also currents on mandrel 200 due to high conductivity and proximity to electromagnetic source 128. Consequently, from the equivalence principle, this mandrel effect may be represented collectively by making the induced currents on mandrel 200 as equivalent sources in free space. For example, both electromagnetic source 128 and induced mandrel currents may contribute to an electromagnetic antenna's field pattern. Moreover, different types of muds such as oil-based mud (OBM) and/or water-based mud (WBM) may affect the electromagnetic antenna's field pattern.

Figure 3:
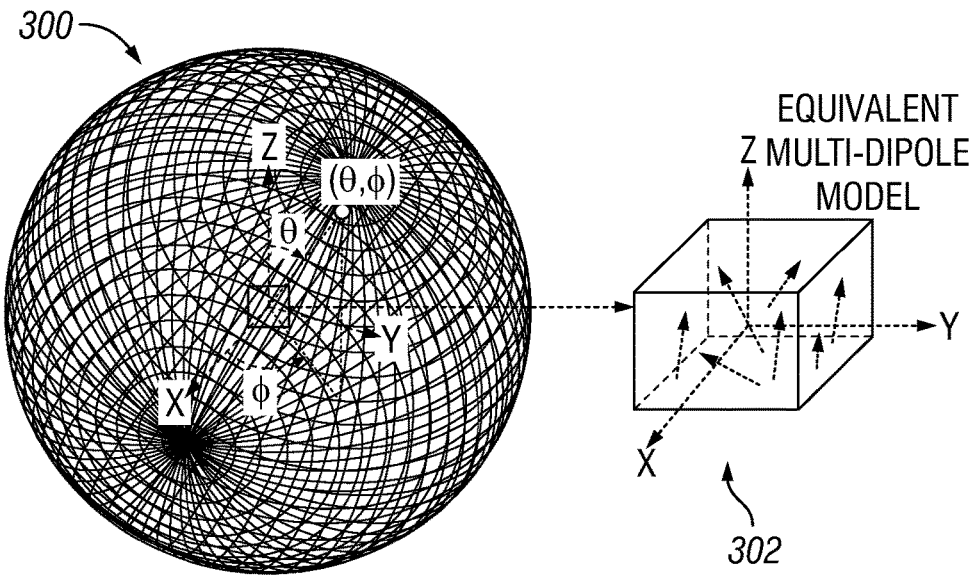
FIG. 3 is a schematic illustration of a pattern sphere and representative multi-dipole model.

As illustrated in FIG. 3, a field pattern 300 may be computed with a full-wave inversion method. Field pattern 300 may comprise a known volume, area, and/or point, wherein a test area comprises a circle that is centered about the center of electromagnetic antenna 130. As discussed above, the full-wave inversion method may comprise large amounts of data that may take large amounts of time to compute. An equivalent multi-dipole model 302, which may be referred to herein as a dipole array equivalent, may be implemented to estimate the inversion of the simulated and/or measured electric and/or magnetic fields, field pattern 300, of electromagnetic antenna 130 (e.g. Referring to FIG. 1). Without limitation, additional equivalent sources may be obtained for different frequencies. An equivalent multi-dipole model may be defined as a simplified model composed of a combination of point dipoles that may be used to replace the original 3D antenna structure. Simplification of the model from an actual 3D antenna structure to a point dipole may allow one to use analytical formulas or semi-analytical electromagnetic solvers instead of 3D solvers. This may enable efficient forward modeling of the original problem. Forward modeling may be important for processing of collected measurements, processing necessitates solution of a full-wave inverse problem, and solution of the full-wave inverse problem requires numerous calls to the forward model. Equivalent sources may be subsequently input into earth modeling and inversion workflows to simulate the actual tilted coil.

In order to determine an equivalent set of dipoles that capture the effect of electromagnetic antenna 130, mandrel 200, and target wellbores 102, the goal may be to find the combination of dipoles that produces an electric and/or magnetic field pattern. In examples, ($\theta$, $\phi$)) may be the H-field produced by electromagnetic antenna 130 within mandrel 200 and target wellbores at location (θ, ϕ)). This may represent a multi-dipole model as seen below:

$$H_{coil}(\theta, \phi) \sim \sum_n H_{model}(\theta, \phi, s_n) \quad (1)$$

where s∈[,,; θ; ϕ; M] and H(θ, ϕ, s) represents the H-field at location (θ, ϕ) of the electric and/or magnetic field produced by the nth dipole locating at the position (,,) with an orientation of (θ, ϕ) and a dipole moment of M. The radius of the pattern sphere may be selected so that it may be smaller than the formation skin depth. The skin depth of the formation δ may be calculated as $$\delta = \sqrt{2/\sigma\mu\omega} \quad (2)$$

where σ and μ are the respective conductivity and permeability of the formation, and ω is the angular frequency of operation. The objective of this equivalent multi-dipole model amounts to finding the attributes of all dipoles s∈[s1, ..., s, ..., sN] such that it produces the same electric and/or magnetic field as the original tilted design of electromagnetic antenna 130. This may be formulated as an optimization problem to minimize the residual sum of squares between the electric and/or magnetic field of electromagnetic antenna 130 within mandrel 200 and the target wellbore and the electric and/or magnetic field obtained from the estimated dipole attributes. This results in the following minimization problem:

$$\hat{s} = \text{argmin}_s e(s) = \text{argmin}_s \left\| [H_{coil}] - \sum_n [H_{model}(s_n)] \right\|^2 \quad (3)$$

where ‖•‖ is the l2-norm of a vector, s is a vector containing the unknown attributes of all dipoles to be estimated, [Hi] is a vector of H field at different pattern points for the original coil within mandrel 200 and second wellbore 112, and [H(s)] is a forward model that produces the H-field of the background (no target) for a given set of dipole attributes s∈[,,; θ; ϕ; M] at the same pattern points as [Hi]. The optimization problem of Equation (3) may be solved by finding a set of optimal s that minimizes the cost function. This may be a non-linear least square problem which may be solved by many approaches. The Levenberg-Marquardt, Gauss-Newton or any algorithm with gradient search may be implemented. One of its main features may be that it does not place parameters on any of the variables within s. Parameters may be placed on any variable to ensure that the variables may fall within a given area. Without limitations, algorithms, such as Iterative Point Reflex, may also be implemented in computations.

Figure 4:
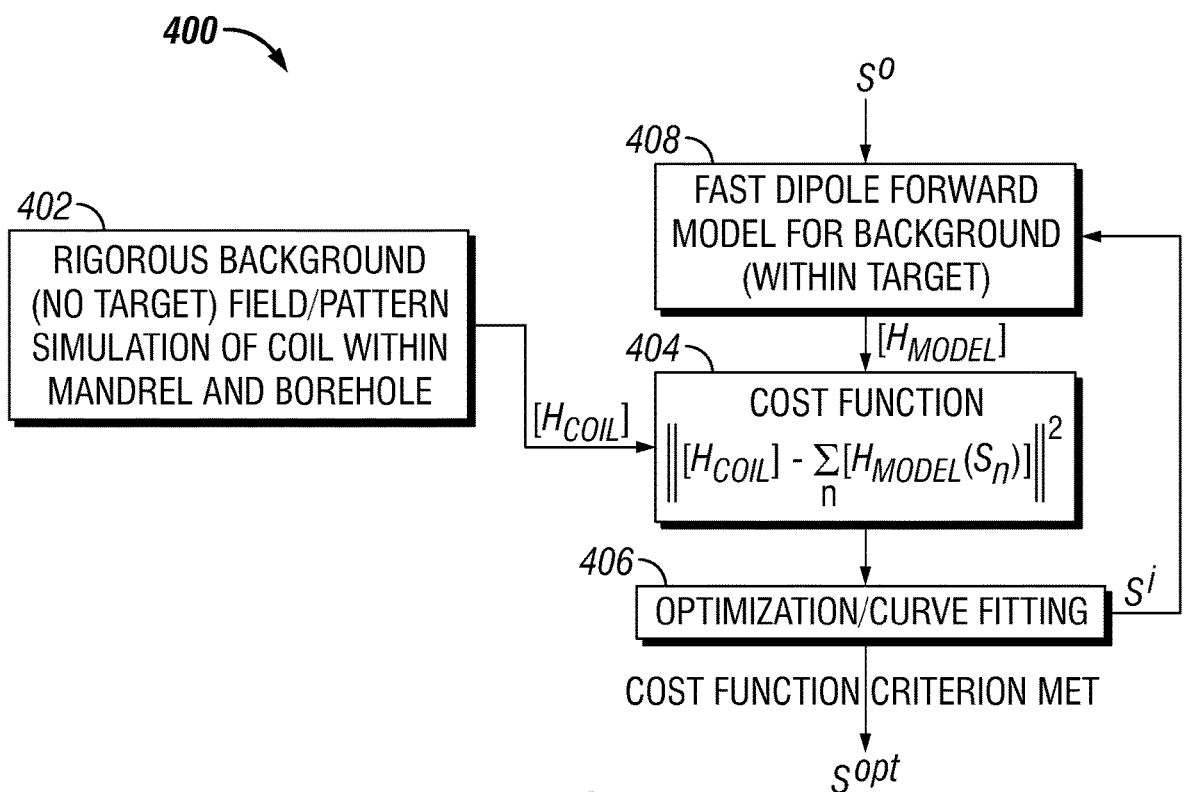
FIG. 4 is a schematic illustration of a flow diagram for a multi-dipole model.

An example technique for obtaining the equivalent multi-dipole model 400 may be illustrated in FIG. 4. Since the properties of electromagnetic antenna 130, mandrel 200, and second wellbore 112 may be known and they may be expected to be dependent on the target, [H], which may be computed through full-wave numerical simulation beforehand and be used as the objective function to find the optimum dipole attributes. In block 402, the equivalent multi-dipole models may be computed to capture the effect of electromagnetic antenna 130, mandrel 200, and second wellbore 112 for the no-target background prior to the inversion. The computed information from block 402 may be input into block 404, which may be a cost function equation. Results from block 404 may be input into block 406 for optimization and/or curve fitting. Therefore, the optimization may be carried out by first assuming a given background (e.g., homogeneous formation). If the cost function criterion may not be met, the results from block 406 may be input into block 408. Block 408 may place the results from block 406 into a fast dipole forward model for background without a target present. Then once the equivalent multi-dipole model may be obtained, it may remain valid for other variations of background and targets. Block 406 may be computed and the results may then be placed back through blocks 404 and 406. Thus, the goal for this equivalent model may be to completely replace the electromagnetic antenna 130, mandrel 200, and second wellbore 112 with a set of dipoles so that they can be used to compute the field responses in the inversion at a faster rate. From forward model used to determine Equation (3) the analytical solution may be available if the background may be homogeneous. But if this is not the case, solutions from other forward solvers are also equally as valid for the optimization scheme outlined in FIG. 4.

To illustrate the process of obtaining the equivalent dipole model outlined above, in FIG. 4, a numerical example of electromagnetic antenna 130 (e.g. Referring to FIG. 1) within mandrel 200 (e.g. Referring to FIG. 2) and second wellbore 112 may be simulated, as illustrated in FIG. 5. Here the simulation may assume electromagnetic antenna 130 may be excited with 1 A (amp) of current at 1 kHz and that the conductivity and relative permeability of the mandrel is 1×106 S/m (steel) and 60. The formation may be assumed to be homogeneous with a resistivity of 10 Ω·m. In addition, the simulation may be carried out for both oil-based mud (OBM) with R=1000 Ω·m and water-based mud (WBM) with R=0.5 Ω·m.

FIG. 5 displays the longitudinal H-field pattern for both the "full electromagnetic antenna" (including mandrel 200 and second wellbore 112) case as well as the "coils in the formation only" case. Here 3D pattern may be shown only for the "full electromagnetic antenna" case while the three 2D cross sections (latitude plane, longitude plane, and y-z plane) of the H-field patterns compare the difference between the "full electromagnetic antenna" with both types of mud and the "coils in the formation only" cases. Because electromagnetic antennae 130 may have a tilted angle of 45°, the longitude plane may be defined to be the plane after 45° clockwise rotation of the x-y plane while latitude plane may be the plane after 45° counterclockwise rotation of the x-y plane. In examples, the pattern may be a shape of a tilted donut resembling that of a tilted magnetic dipole resulting from our tilted coil design. From FIG. 5, the amplitude of the "full electromagnetic antenna" case may be stronger than that of electromagnetic antennae 130 only. Moreover, the patterns for WBM and OBM almost overlay on top of each other, suggesting that the mud does not introduce any additional impact. As illustrated in FIG. 5, a difference between "full electromagnetic antenna" and "electromagnetic antennae only" may not be based on effective gain. As illustrated in the y-z plane, a different tilted angle for the "full electromagnetic antenna" may be shown. This may be due to a tilted angle offset of 2-4° from the 45° axis. This angle offset may be part of the impact to tilted electromagnetic antenna 130 by mandrel 200.

Figure 6B:
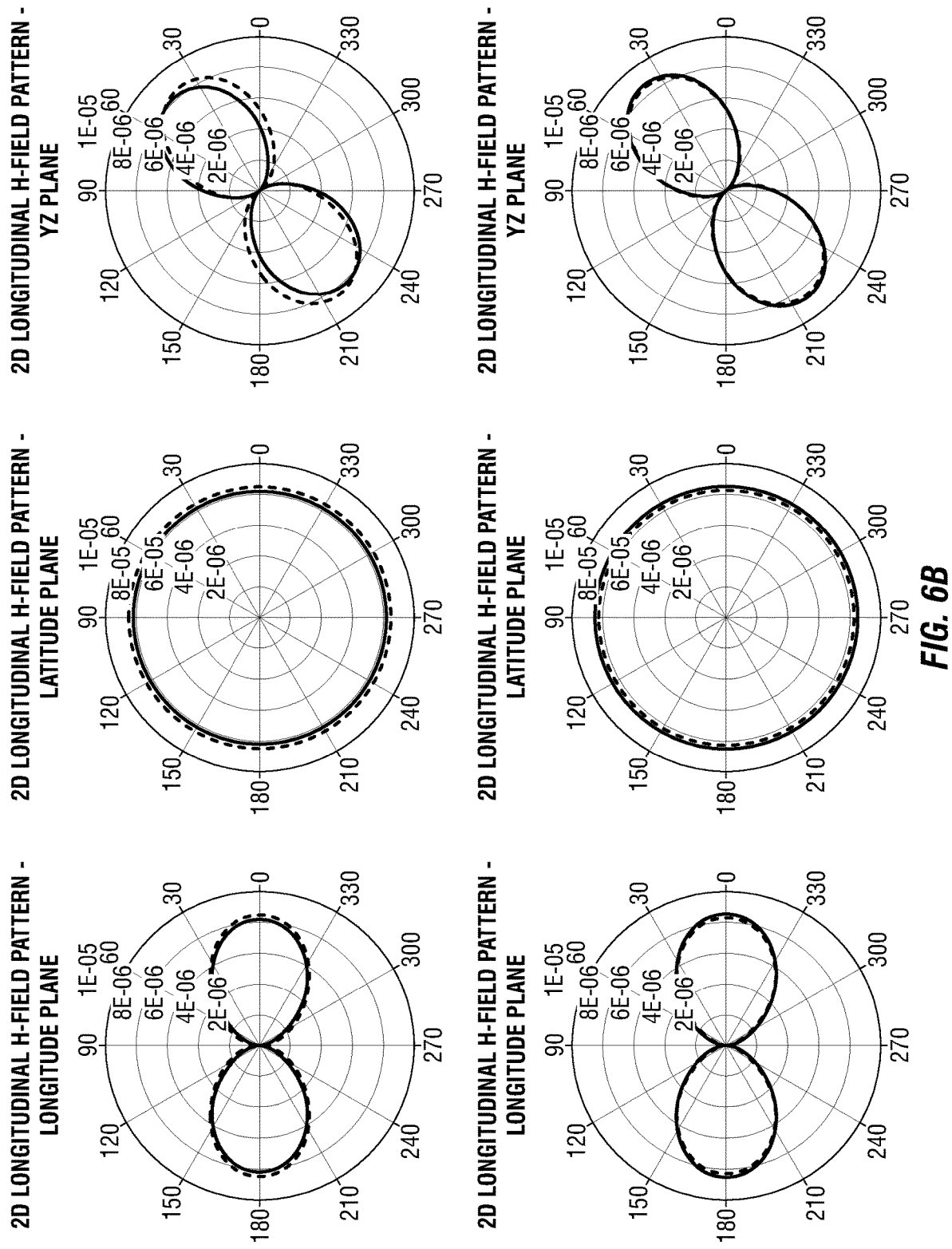
FIG. 6 is a schematic illustration of an optimization of an equivalent multi-dipole model.
Figure 7B:
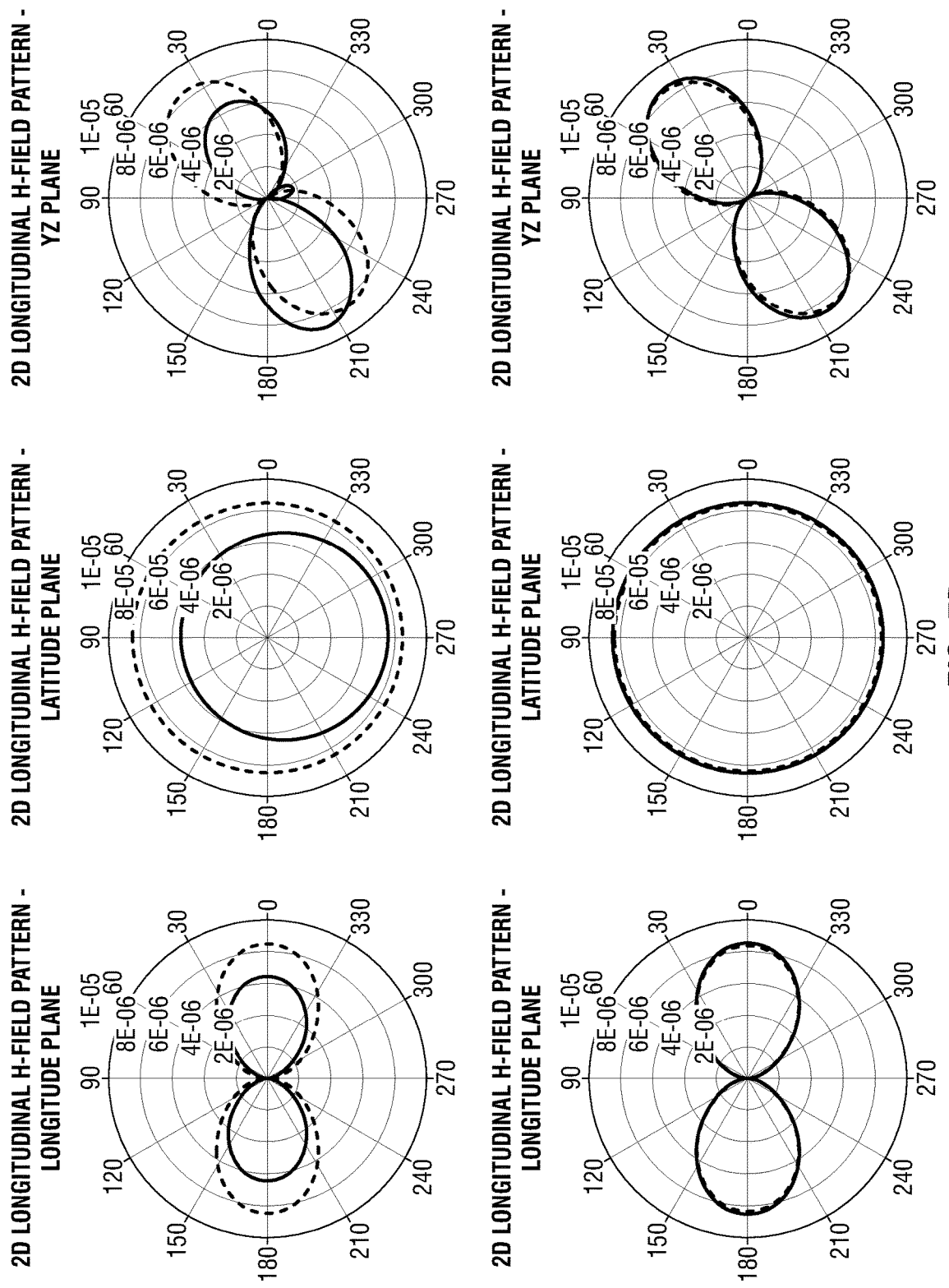
FIG. 7 is a schematic illustration of an additional optimization of an equivalent multi-dipole model.

To illustrate the optimization of obtaining the equivalent multi-dipole model, the three cross section patterns of the "full electromagnetic antenna" case may be the [H] in Equation (3). In examples, the background formation may be homogeneous, [H] may be computed through the analytical forward model. FIG. 6 and FIG. 7 display the optimization with different initial guesses (S0). In FIG. 6, the initial guess may be a single 45°-tilted dipole with an arbitrarily selected moment of 8×10−4, which may be a donut-shaped pattern similar to that of the "electromagnetic antenna only" case in FIG. 6. After the first few steps of the optimization, a maximum amplitude may be reached but may comprise a tilted angle that is incorrect. A few more iterations after that correct the tilted angle. To further test out the robustness of the algorithm, FIG. 8 displays the optimization with an initial guess chosen to be a z-directed dipole shifted 2 meters in the z direction with a moment of 8×10−4. As shown, the initial pattern no longer has symmetry and has a very different shape compared to that in FIG. 6. However in just a few steps of the optimization, dipole attributes that produces the same pattern as the "full antenna". Interestingly in this particular example, the equivalent multi-dipole model turns out to have most of its contribution coming from a single dipole that is shifted several inches from the origin with an orientation that is 31° from the z-axis and −90 degree from the x-axis. It should be noted that the optimization in Equation (3) may run into local minima. To ensure finding of the global minimum, a number of different initial guesses may be used to find one whose output minimizes the objective function more than others. Furthermore, to avoid running into non-uniqueness problem, the size of [$H_{coil}$] may be larger than s. Thus, the more information on pattern data available may increase optimization.

Figure 8:
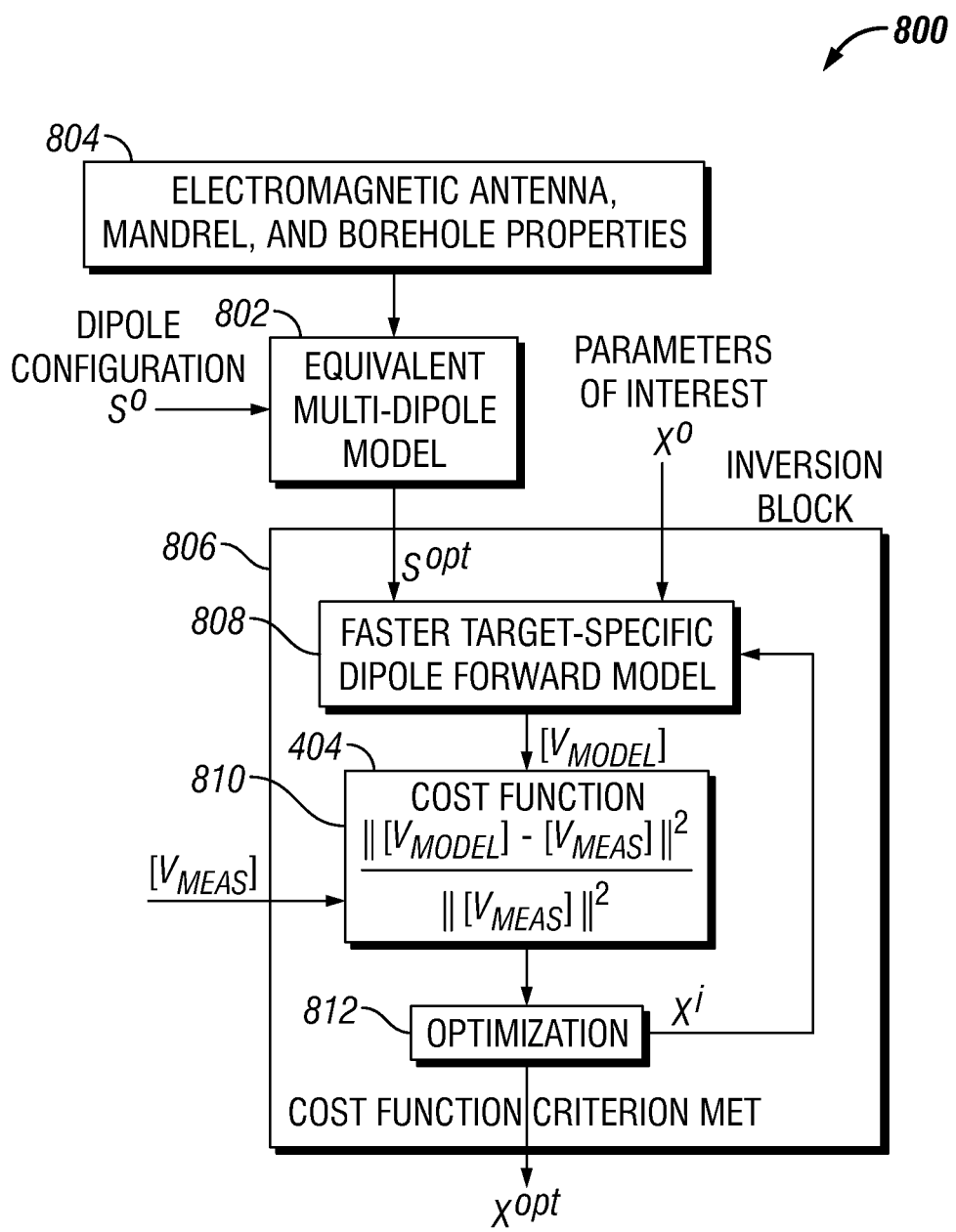
FIG. 8 illustrates a flow diagram of an equivalent multi-dipole model.

The flow diagram in FIG. 8 illustrates the equivalent multi-dipole model. Because the designs of electromagnetic antenna 130 (e.g. Referring to FIG. 1), sleeve, and mandrel 200 (e.g. Referring to FIG. 2) along with their interaction with the second wellbore 112 have many fine geometric details, modeling them accurately may require full-wave techniques. However, in most applications of the electromagnetic antenna 130 based induction tool, inversion may be required to determine unknown parameters of interest such as range to target well, resistivity of a formation bed, and distance to oil-water interface etc. Consequently, performing full-wave forward modeling at every iteration may be impractical due to their long simulation time. Thus, approximating the impact of electromagnetic antenna 130, mandrel 200, and second wellbore 112 through an equivalent multi-dipole model prior to utilizing the inversion. Because this equivalent model may be obtained through optimization of the field pattern, it may virtually be applied to any designs of electromagnetic antennae 130 and mandrels 200. As shown in FIG. 8, inversion process 800, block 802 may find a set of dipole that best approximate the field pattern produced by electromagnetic antenna 130 assuming a given background. In block 804 the properties of electromagnetic antenna 130, mandrel 200, and the second wellbore 112 may be input into the block 802 to help approximate the field pattern. Results from block 802 may be input into an inversion process represented by block 806. Specifically, results from block 802 may be computed with a faster target-specific dipole forward model, represented by block 808. Results from block 808 may be input into block 810 which may be a cost function, which may then be optimized in block 812. Optimization in block 812 may move results back to block 808 for further computing if cost function criterion has not been met, and/or produce information of the electric and/or magnetic field recorded by electromagnetic antenna 130. Once this equivalent model may be determined, it may be used to replace the impact of electromagnetic antenna 130, mandrel 200, and second wellbore 112 for other variations of background and targets. It may be used as the inputs to a much faster target specific forward model in the inversion. This proposed method may be able to capture the effect of mandrel and second wellbore 112 accurately while avoiding the need to run full-wave forward modeling (e.g. Referring to FIG. 4) in the inversion.

Figure 9:
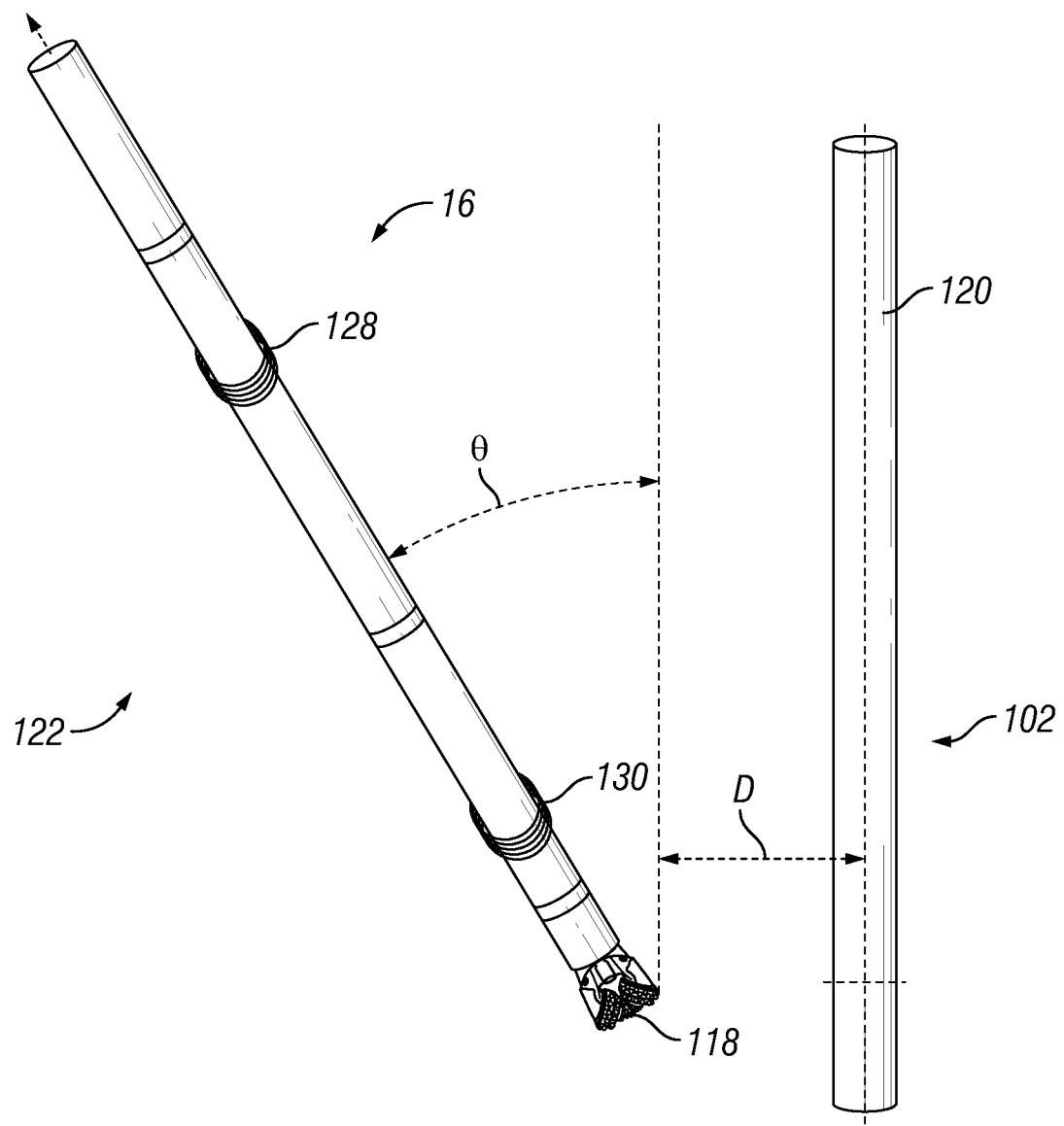
FIG. 9 illustrates a schematic illustration of an electromagnetic induction tool in a ranging application.

FIG. 9 illustrates an electromagnetic induction tool 122 in a ranging application. Electromagnetic induction tool 122 may be used to determined location of target wellbore 102, including direction and distance to target wellbore 102. Direction to target wellbore 102 may be represented by the inclination angle θ of electromagnetic induction tool 122 with respect to target wellbore 102. Distance to target wellbore 102 may be represented by the distance D from drill bit 118 to target wellbore 102. As illustrated, electromagnetic induction tool 122 may be used in determining location of target wellbore 102, including distance D and inclination angle θ. In examples, an electromagnetic field may be transmitted from electromagnetic source 128, which may excite conductive body 120 within target wellbore 102. This may create a secondary electromagnetic field emanating from conductive body 120. This secondary electromagnetic field may be recorded by electromagnetic antenna 130 and analyzed. Analyses of the measured secondary electromagnetic filed may provide the distance D and inclination angle θ between target wellbore 10 and electromagnetic induction tool 122.

Figure 10:
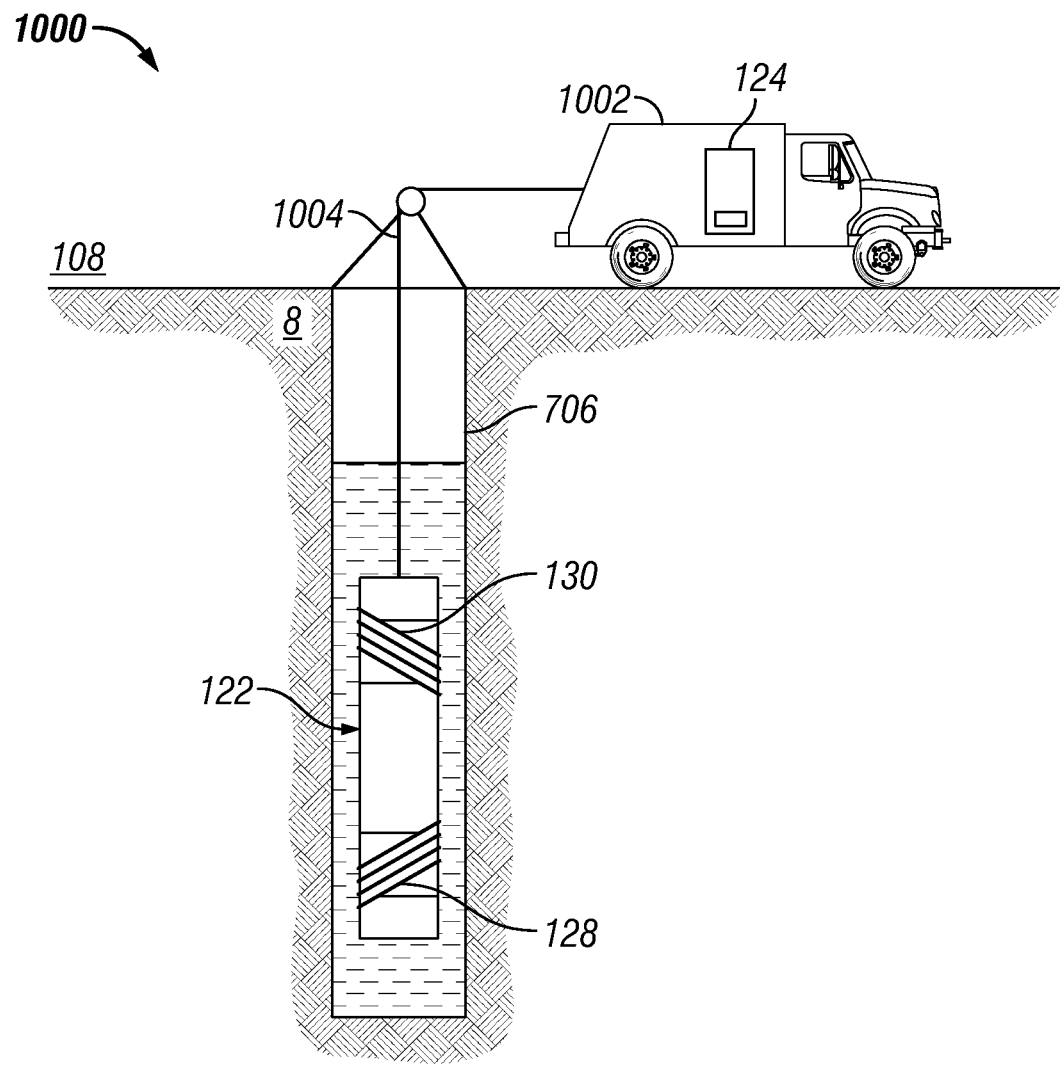
FIG. 10 illustrates a schematic illustration of a wireline system with an electromagnetic induction tool.

Without limitation, electromagnetic induction tool 122 may be incorporated into a conveyance. FIG. 10 illustrates an example of a conveyance system 1000. Conveyance system 1000 may comprise a recovery vehicle 1002, conveyance 1004, and/or electromagnetic induction tool 122. Recovery vehicle 1002 may be disposed at surface 108 of wellbore 1006. Recovery vehicle 1002 may include a spool (not shown) for raising and lowering conveyance 1004 in wellbore 1006. As illustrated, electromagnetic induction tool 122 may be coupled to conveyance 1004, for example, at a distal end of conveyance 1004. Conveyance 1004 may be disposed around one or more sheave wheels (not illustrated) to recovery vehicle 1002. Conveyance 1004 may include any suitable means for providing mechanical conveyance for electromagnetic induction tool 122, including, but not limited to, wireline, slickline, coiled tubing, pipe, drill pipe, downhole tractor, or the like. In some embodiments, conveyance 1004 may provide mechanical suspension, as well as electrical connectivity, for electromagnetic induction tool 122. Conveyance 1004 may comprise, in some instances, a plurality of electrical conductors extending from recovery vehicle 1002. Conveyance 1004 may comprise an inner core of seven electrical conductors covered by an insulating wrap. An inner and outer steel armor sheath may be wrapped in a helix in opposite directions around the conductors. The electrical conductors may be used for communicating power and telemetry between recovery vehicle 1002 and electromagnetic induction tool 122. Information from electromagnetic induction tool 122 may be gathered and/or processed by information handling system 124. For example, signals recorded by electromagnetic induction tool 122 may be stored on memory and then processed by electromagnetic induction tool 122. The processing may be performed real-time during data acquisition or after recovery of electromagnetic induction tool 122. Processing may alternatively occur downhole or may occur both downhole and at surface. In some embodiments, signals recorded by electromagnetic induction tool 122 may be conducted to information handling system 124 by way of conveyance 1004. Information handling system 124 may process the signals, and the information contained therein may be displayed for an operator to observe and stored for future processing and reference. Information handling system 124 may also contain an apparatus for supplying control signals and power to electromagnetic induction tool 122.

Electromagnetic induction tool 122 may include electromagnetic source 128 and electromagnetic antenna 130. Signals from electromagnetic antenna 130 may be transmitted to an information handling system 124, which may be disposed on recovery vehicle 1002, for example. It should be understood that other types of wireline systems may be employed, including those in which the wireline is disposed from a spool that is installed at surface 108 instead of being located on a recovery vehicle 1002. Specific information about subterranean formation 106, such as resistivity, may be inferred from analysis of the signal from electromagnetic antenna 130. In certain examples, a wireline log may be developed from the signal that includes information about subterranean formation 106, such as formation resistivity.

Figure 11:
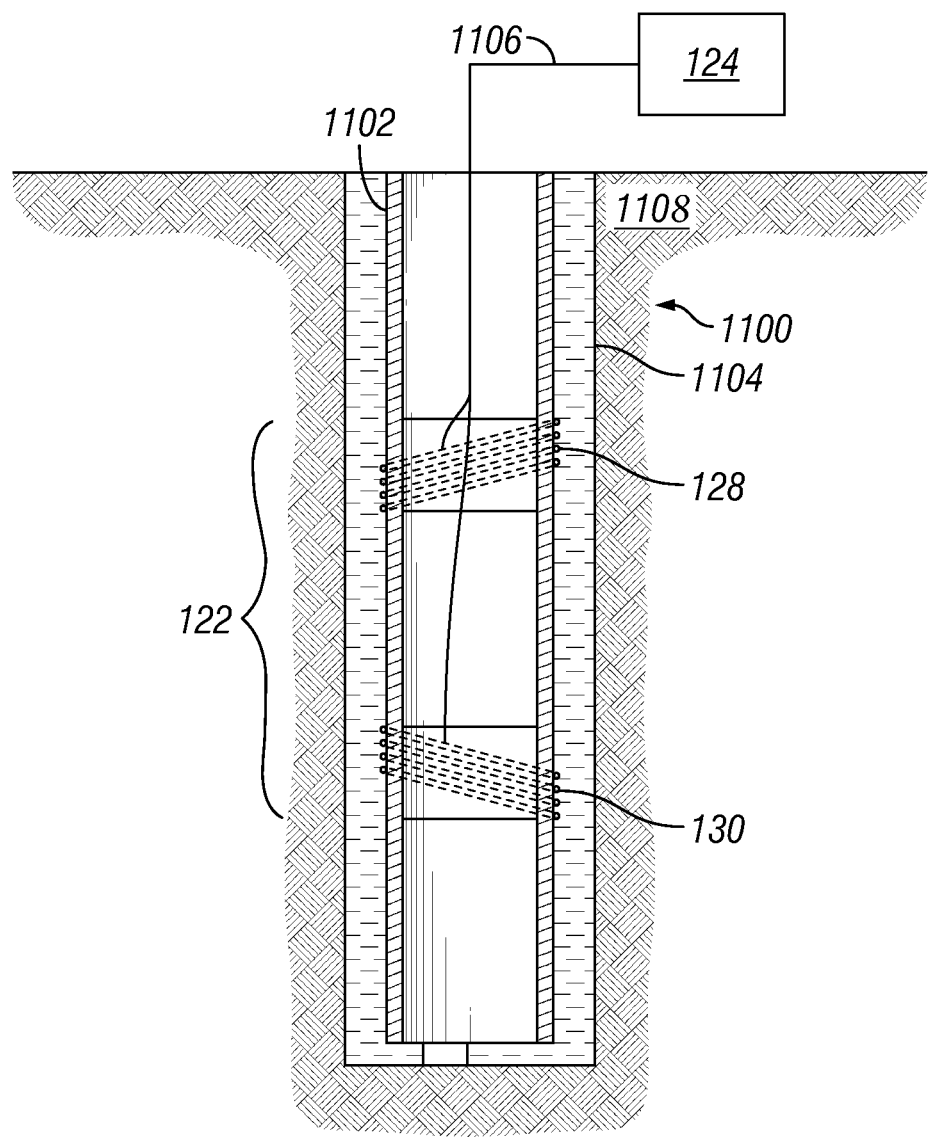
FIG. 11 illustrates a schematic illustration of a permanent monitoring system with an electromagnetic induction tool.

FIG. 11 illustrates an example of a permanent monitoring system 1100 in which electromagnetic induction tool 122 has been incorporated. As will be appreciated, permanent monitoring system 1100 may be used to monitor formation properties, including approaching flood fronts (not illustrated). In examples, permanent monitoring system 1100 may comprise a casing 1102 disposed within wellbore 1104 penetrating subterranean formation 106. Permanent monitoring system 1100 may also comprise electromagnetic induction tool 122, which may comprise electromagnetic source 128 and electromagnetic antenna 130. Information handling system 124 may connect to electromagnetic source 128 and/or electromagnetic antenna 130 through communication link 1106. Signals from electromagnetic antenna 130 may be transmitted to information handling system 124 by way of communication link 1106. Specific information about subterranean formation 1108, such as resistivity, approaching flood front, etc., may be inferred from analysis of the signal from electromagnetic antenna 130.

This method and system may include any of the various features of the compositions, methods, and system disclosed herein, including one or more of the following statements.

Statement 1: A method for dipole modeling comprising: providing an electromagnetic induction tool comprising an electromagnetic antenna; disposing the electromagnetic induction tool in a wellbore; activating the electromagnetic antenna; producing a dipole array equivalent of the electromagnetic antenna, wherein the dipole array equivalent comprises at least two dipoles; and implementing the dipole array equivalent in a forward model within an inversion process, wherein the inversion process determines an electromagnetic property.

Statement 2: The method of statement 1, wherein the electromagnetic antenna comprises a non-azimuthal antenna or a tilted electromagnetic antenna.

Statement 3: The method of statement 1 or statement 2, wherein the dipole array equivalent comprises a magnetic dipole, electric dipole, or combination of the magnetic dipole and the electric dipole.

Statement 4: The method of any preceding statement, wherein the inversion process determines a second electromagnetic property.

Statement 5: The method of any preceding statement, further comprising producing a second dipole array equivalent of the electromagnetic antenna, wherein the second dipole array equivalent comprises at least two dipoles; and implementing the second dipole array equivalent in the forward model within the inversion process, wherein the second inversion process determines a second electromagnetic property.

Statement 6: The method of any preceding statement, wherein a forward model output comprises two or more frequencies and the same dipole array equivalent process is used for at least two of the frequencies.

Statement 7: The method of any preceding statement, wherein a forward model output comprises two or more frequencies and different dipole array equivalents are used for different frequencies.

Statement 8: The method of any preceding statement, wherein the dipole array equivalent comprises dipoles with different orientations, moments, and/or positions, and wherein at least one of the two dipoles is positioned within boundaries of the wellbore.

Statement 9: The method of any preceding statement, wherein at least one of the two dipoles is positioned within boundaries of a tool body for the electromagnetic induction tool.

Statement 10: The method of any preceding statement, wherein the producing the dipole array equivalent comprises calculating the dipole array equivalent through the inversion process, wherein an orientation and moment of the dipole array equivalent is adjusted until the dipole array equivalent is equivalent to a field pattern, and wherein the field comprises a known volume, area, and/or point, wherein a test area comprises a circle that is centered about the center of the electromagnetic antenna, and wherein the non-dipole model comprises an element, a difference, a moment, and/or an integral equation.

Statement 11: The method of any preceding statement, wherein the electromagnetic property comprises at least one property selected from the group consisting of resistivity of a formation layer, a location of the formation layer, a distance to a target well, a direction of the target well, a dielectric construction of the formation layer, and a distance to a waterflood.

Statement 12: The method of any preceding statement, further comprising storing the dipole array equivalent in the electromagnetic induction tool, performing the inversion process downhole, and communicating the electromagnetic property to a surface of the wellbore.

Statement 13: The method of any preceding statement, further comprising adjusting at least one operational parameter of a well operation based at least in part on the electromagnetic property, applying a cost function in the inversion process, and computing a cost function value, wherein the cost function value comprises the dipole array equivalent.

Statement 14: The method of any preceding statement, wherein the electromagnetic induction tool comprises a second electromagnetic antenna, wherein the electromagnetic antenna comprises a transmitter, and the second electromagnetic antenna comprises a receiver and further comprising performing a second inversion process that comprises information from the first electromagnetic antenna and the second electromagnetic antenna.

Statement 15: The method of any preceding statement, wherein the electromagnetic antenna comprises a transmitter, receiver, or transceiver.

Statement 16: A method for dipole modeling comprising: providing an electromagnetic induction tool comprising an electromagnetic antenna; disposing the electromagnetic induction tool in a wellbore on a wireline; activating the electromagnetic antenna; producing a dipole array equivalent of the electromagnetic antenna, wherein the dipole array equivalent comprises at least two dipoles; and implementing the dipole array equivalent in a forward model within an inversion process, wherein the inversion process determines an electromagnetic property.

Statement 17: The method of statement 16, wherein the forward model computes an equivalent multi-dipole model and the equivalent multi-dipole model comprises parameters of the electromagnetic antenna, a mandrel, and the wellbore.

Statement 18: The method of statement 16 or statement 17, wherein a target-specific dipole forward model comprises the equivalent multi-dipole model and the target-specific dipole forward model is processed in a cost function and is optimized.

Statement 19: The method of statements 16-18, wherein the electromagnetic induction tool is disposed in the wellbore for permanent monitoring.

Statement 20: The method of statements 16-20, further comprising applying the dipole array equivalent and one or more additional dipole array equivalents to one or more additional inversion processes for different field patterns.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for dipole modeling comprising:
providing an electromagnetic induction tool comprising an electromagnetic antenna;
disposing the electromagnetic induction tool in a wellbore;
activating the electromagnetic antenna;
producing a dipole array equivalent of an electromagnetic field pattern that comprises at least two dipoles formed from the electromagnetic antenna, the wellbore, or a mandrel;
identifying one or more effects of the electromagnetic antenna, the mandrel, and the wellbore on the electromagnetic field pattern;
inputting the dipole array equivalent in a forward model within an inversion process;
determining an electromagnetic property from the inversion process.

2. The method of claim 1, wherein the electromagnetic antenna comprises a non-azimuthal antenna or a tilted electromagnetic antenna.

3. The method of claim 1, wherein the dipole array equivalent comprises a magnetic dipole, electric dipole, or combination of the magnetic dipole and the electric dipole.

4. The method of claim 1, wherein the inversion process determines a second electromagnetic property.

5. The method of claim 1, further comprising
producing a second dipole array equivalent of the electromagnetic antenna, wherein a second dipole array equivalent comprises at least two dipoles; and
implementing the second dipole array equivalent in the forward model within a second inversion process, wherein the second inversion process determines a second electromagnetic property.

6. The method of claim 1, wherein a forward model output comprises two or more frequencies.

7. The method of claim 1, wherein a forward model output comprises two or more frequencies and different dipole array equivalents are used for different frequencies.

8. The method of claim 1, wherein the dipole array equivalent comprises dipoles with different orientations, moments, and/or positions, and wherein at least one of the two dipoles is positioned within boundaries of the wellbore.

9. The method of claim 8, wherein at least one of the two dipoles is positioned within boundaries of a tool body for the electromagnetic induction tool.

10. The method of claim 1, wherein the producing the dipole array equivalent comprises calculating the dipole array equivalent through the inversion process, wherein an orientation and moment of the dipole array equivalent is adjusted until the dipole array equivalent is equivalent to a field pattern, and wherein the field pattern comprises a known volume, area, and/or point, wherein a test area comprises a circle that is centered about the center of the electromagnetic antenna, and wherein a non-dipole model comprises an element, a difference, a moment, and/or an integral equation.

11. The method of claim 1, wherein the electromagnetic property comprises at least one property selected from the group consisting of resistivity of a formation layer, a location of the formation layer, a distance to a target well, a direction of the target well, a dielectric construction of the formation layer, and a distance to a waterflood.

12. The method of claim 1, further comprising storing the dipole array equivalent in the electromagnetic induction tool, performing the inversion process downhole, and communicating the electromagnetic property to a surface of the wellbore.

13. The method of claim 1, further comprising adjusting at least one operational parameter of a well operation based at least in part on the electromagnetic property, applying a cost function in the inversion process, and computing a cost function value, wherein the cost function value comprises the dipole array equivalent.

14. The method of claim 1, wherein the electromagnetic induction tool comprises a second electromagnetic antenna, wherein the electromagnetic antenna comprises a transmitter, and the second electromagnetic antenna comprises a receiver and further comprising performing a second inversion process that comprises information from the first electromagnetic antenna and the second electromagnetic antenna.

15. The method of claim 1, wherein the electromagnetic antenna comprises a transmitter, receiver, or transceiver.

16. The method of claim 1, wherein the forward model computes an equivalent multi-dipole model and the equivalent multi-dipole model comprises parameters of the electromagnetic antenna, a mandrel, and the wellbore.

17. The method of claim 16, wherein a target-specific dipole forward model comprises the equivalent multi-dipole model and the target-specific dipole forward model is processed in a cost function and is optimized.

18. The method of claim 1, wherein the electromagnetic induction tool is disposed in the wellbore for permanent monitoring.

19. The method of claim 1, further comprising applying the dipole array equivalent and one or more additional dipole array equivalents to one or more additional inversion processes for different field patterns.

20. A method for dipole modeling comprising:
providing an electromagnetic induction tool comprising an electromagnetic antenna;
disposing the electromagnetic induction tool in a wellbore;
activating the electromagnetic antenna;
producing a dipole array equivalent of the electromagnetic antenna, wherein the dipole array equivalent comprises at least two dipoles, and wherein the producing the dipole array equivalent comprises calculating the dipole array equivalent through an inversion process, wherein an orientation and moment of the dipole array equivalent is adjusted until the dipole array equivalent is equivalent to a field pattern, and wherein the field pattern comprises a known volume, area, and/or point, wherein a test area comprises a circle that is centered about the center of the electromagnetic antenna, and wherein a non-dipole model comprises an element, a difference, a moment, or an integral equation; and
implementing the dipole array equivalent in a forward model within the inversion process, wherein the inversion process determines an electromagnetic property.

21. A method for dipole modeling comprising:
providing an electromagnetic induction tool comprising an electromagnetic antenna;
disposing the electromagnetic induction tool in a wellbore on a wireline;
activating the electromagnetic antenna;
producing a dipole array equivalent of the electromagnetic antenna, wherein the dipole array equivalent comprises at least two dipoles;
implementing the dipole array equivalent in a forward model within an inversion process, wherein the inversion process determines an electromagnetic property; and
applying the dipole array equivalent and one or more additional dipole array equivalents to one or more additional inversion processes for different field patterns.

22. A system for dipole modeling comprising:
an electromagnetic induction tool comprising:
 a mandrel;
 one or more electromagnetic sources disposed on the mandrel;
 an electromagnetic antenna disposed on the mandrel; and
 a ferrite sleeve layer disposed between the electromagnetic antenna and the mandrel; and
an information handling system connected to the electromagnetic induction tool by a conveyance and configured to:
 activate the electromagnetic antenna;
 produce a dipole array equivalent of an electromagnetic field pattern that comprises at least two dipoles formed from the electromagnetic antenna, the wellbore, or the mandrel;
 identify one or more effects of the electromagnetic antenna, the mandrel, and the wellbore on the electromagnetic field pattern;
 input the dipole array equivalent in a forward model within an inversion process;
and determine an electromagnetic property from the inversion process.

* * * * *